(12) United States Patent
Anai

(10) Patent No.: US 8,606,736 B2
(45) Date of Patent: Dec. 10, 2013

(54) TECHNIQUE FOR SOLVING OPTIMIZATION PROBLEM

(75) Inventor: Hirokazu Anai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 13/160,675

(22) Filed: Jun. 15, 2011

(65) Prior Publication Data

US 2012/0072385 A1 Mar. 22, 2012

(30) Foreign Application Priority Data

Sep. 22, 2010 (JP) ................................. 2010-212686

(51) Int. Cl.
*G06F 17/00* (2006.01)
(52) U.S. Cl.
USPC .......................................................... 706/46
(58) Field of Classification Search
None
See application file for complete search history.

(56) References Cited

U.S. PATENT DOCUMENTS

| | | | |
|---|---|---|---|
| 7,516,423 B2 | 4/2009 | De Smedt et al. | |
| 2005/0159935 A1* | 7/2005 | Orii et al. ........................ | 703/2 |
| 2005/0257178 A1 | 11/2005 | Daems et al. | |
| 2009/0182538 A1* | 7/2009 | Yanami et al. .................. | 703/2 |
| 2009/0182539 A1* | 7/2009 | Anai et al. ...................... | 703/2 |
| 2009/0182695 A1* | 7/2009 | Yanami et al. .................. | 706/19 |
| 2009/0326875 A1* | 12/2009 | Yanami et al. .................. | 703/1 |
| 2009/0326881 A1* | 12/2009 | Anai et al. ...................... | 703/2 |
| 2010/0153074 A1 | 6/2010 | Yanami et al. | |
| 2010/0205574 A1* | 8/2010 | Anai et al. ...................... | 716/5 |
| 2011/0022365 A1* | 1/2011 | Iwane et al. ..................... | 703/2 |
| 2011/0184706 A1* | 7/2011 | Iwane et al. ..................... | 703/2 |
| 2011/0295573 A1* | 12/2011 | Iwane et al. ..................... | 703/2 |
| 2012/0046915 A1* | 2/2012 | Yanami et al. ................... | 703/1 |

OTHER PUBLICATIONS

Arnon et al, Cylindrical Algebraic Decomposition I: The Basic Algorithm, 1982.*
Fotiou et al, Nonlinear parametric optimization using cylindrical algebraic decomposition, 2005.*
Anai, Hirokazu et al., "Design Technology Based on Symbolic Computation", Fujitsu, vol. 60, No. 5, Sep. 2009, pp. 514-521, with English Abstract.
Anai, Hirokazu et al., "Introduction to Computational Real Algebraic Geometry, Series No. 1", Mathematics Seminar, vol. 554, Nippon-Hyoron-sha Co., Ltd., Nov. 2007, pp. 64-70, with English translation.

(Continued)

*Primary Examiner* — Jeffrey A Gaffin
*Assistant Examiner* — Mikayla Chubb
(74) *Attorney, Agent, or Firm* — Fujitsu Patent Center

(57) ABSTRACT

A method for solving an optimization problem includes: causing a cylindrical algebraic decomposition (CAD) processing unit to carry out a projection processing for a first expression that appears in a quantifier elimination problem equivalent to the optimization problem including objective functions and to generate second expressions that are projection factors of the first expression; calculating plural sets of values of the objective functions by generating plural value sets of variables in the objective functions and substituting the generated plural value sets of the variables into the objective functions; extracting points including non-dominated solutions in a space mapped by the objective functions, from plural points corresponding to the plural sets of values; calculating, for each second expression, an evaluation value concerning a distance between a corresponding second expression and each of the extracted points; and identifying a second expression whose evaluation value is minimum.

6 Claims, 10 Drawing Sheets

(56) References Cited

OTHER PUBLICATIONS

Anai, Hirokazu et al., "Introduction to Computational Real Algebraic Geometry, Series No. 2", Mathematics Seminar, vol. 555, Nippon-Hyoron-sha Co., Ltd., Dec. 2007, pp. 75-81, with English translation.
Anai, Hirokazu et al., "Introduction to Computational Real Algebraic Geometry, Series No. 3", Mathematics Seminar, vol. 556, Nippon-Hyoron-sha Co., Ltd., Jan. 2008, pp. 76-83, with English translation.
Anai, Hirokazu et al., "Introduction to Computational Real Algebraic Geometry, Series No. 4", Mathematics Seminar, vol. 558, Nippon-Hyoron-sha Co., Ltd., Mar. 2008, pp. 79-85, with English translation.
Anai, Hirokazu et al., "Introduction to Computational Real Algebraic Geometry, Series No. 5", Mathematics Seminar, vol. 559, Nippon-Hyoron-sha Co., Ltd., Apr. 2008, pp. 82-89, with English translation.
Jirstrand, Mats et al., "Cylindrical Algebraic Decomposition—an Introduction", Oct. 18, 1995, pp. 1-38.

* cited by examiner $F_r \subset Q[x_1, \cdots, x_r]$

↓ PROJECTION 1

$F_{r-1} \subset Q[x_1, \cdots, x_{r-1}]$

↓ PROJECTION 2

⋮

↓ PROJECTION (r − 2)

$F_2 \subset Q[x_1, x_2]$

↓ PROJECTION (r − 1)

$F_1 \subset Q[x_1]$ $$\begin{cases} \min f = \{f_1, f_2\} \\ \quad f_1 = 2\sqrt{x_1} \qquad f_2 = x_1(1-x_2)+5 \\ \text{subject to} \\ \qquad x_1 - 1 \geq 0 \quad 4 - x_1 \geq 0 \\ \qquad x_2 - 1 \geq 0 \quad 2 - x_2 \geq 0 \end{cases}$$

$$\exists x_1 \exists x_2 \left( f_1 = 2\sqrt{x_1} \wedge f_2 = x_1 - x_1 x_2 + 5 \wedge 1 \le x_1 \le 4 \wedge 1 \le x_2 \le 2 \right)$$

| $f_1$ | $f_2$ | SECTION |
|---|---|---|
| $a_1$ | $b_1$ | 1 |
| $a_2$ | $b_2$ | 2 |
| $a_3$ | $b_3$ | 4 |
| ⋮ | ⋮ | ⋮ |

FIG.12

| POLYNOMIAL | EVALUATION VALUE |
|---|---|
| $g_1$ | $e_1$ |
| $g_2$ | $e_2$ |
| $g_3$ | $e_3$ |
| $g_4$ | $e_4$ |
| $g_5$ | $e_5$ |
| ⋮ | ⋮ |

FIG.13

| SECTION | POLYNOMIAL |
|---|---|
| $[l, q_1]$ | $g_1$ |
| $[q_1, q_2]$ | $g_1$ |
| $[q_2, q_3]$ | $g_1$ |
| $[q_3, r]$ | $g_3$ |

FIG.14

TECHNIQUE FOR SOLVING OPTIMIZATION PROBLEM

CROSS-REFERENCE TO RELATED APPLICATIONS

This application is based upon and claims the benefit of priority of the prior Japanese Patent Application No. 2010-212686, filed on Sep. 22, 2010, the entire contents of which are incorporated herein by reference.

FIELD

This technique relates to a computational processing technique using computer algebra.

BACKGROUND

A problem to simultaneously minimize values of two or more objective functions is known as a multiobjective optimization problem. Such a multiobjective optimization problem is used in a design stage of producing goods, and some conventional examples exist that the multiobjective optimization problem is applied to the design of a Static Random Access Memory (SRAM) and a slider in a Hard disk drive.

For example, in the design of SRAM, a problem to simultaneously minimize an objective function $f_1$ ($x_1$, $x_2$) for the power and objective function $f_2$ ($x_1$, $x_2$) for the size is solved in value ranges of variables $x_1$ and $x_2$.

There are a lot of techniques for solving such multiobjective optimization problems at high speed by numerical analysis.

On the other hand, there are some techniques for solving the multiobjective optimization problem by the computer algebra. In this method, computer simulation is carried out for various design parameter values to calculate output evaluation indicators for each case. Then, a model expression to approximate a relationship between the design parameters and output evaluation indicators is calculated to carry out optimization based on this model expression by using the computer algebra. As a processing for the optimization, there is a case where an expression representing a relationship between the cost and the performance is calculated from the obtained approximate expression and constraint conditions.

Incidentally, as for the computer algebra, a Quantifier Elimination (QE) method is known. This technique is a technique that an expression "$\exists x\ (x^2+bx+c=0)$", for example, is changed to an equivalent expression "$b^2-4c \geq 0$" by eliminating quantifiers such as "$\exists$ and $\forall$".

Specifically, the QE method is described in the following documents. However, because a lot of documents for the QE method exist, useful documents other than the following document exist. These documents are incorporated herein by reference.

Anai Hirokazu and Yokoyama Kazuhiro, "Introduction to Computational Real Algebraic Geometry", *Mathematics Seminar,* Nippon-Hyoron-sha Co., Ltd., "Series No. 1", Vol. 554, pp. 64-70, November, 2007, "Series No. 2", Vol. 555, pp. 75-81, December, 2007, "Series No. 3", Vol. 556, pp. 76-83, January, 2008, "Series No. 4", Vol. 558, pp. 79-85, March, 2008, "Series No. 5", Vol. 559, pp. 82-89, April, 2008.

Anai Hirokazu, Kaneko Junji, Yanami Hitoshi and Iwane Hidenao, "Design Technology Based on Symbolic Computation", *FUJITSU,* Vol. 60, No. 5, pp. 514-521, September, 2009.

Jirstrand Mats, "Cylindrical Algebraic Decomposition—an Introduction", Oct. 18, 1995.

It is possible to obtain solutions of the aforementioned multiobjective optimization problem by the aforementioned quantifier elimination method. However, the calculation efficiency of solving the aforementioned multiobjective optimization problem by the quantifier elimination method is bad, and the processing time becomes long.

SUMMARY

This method for solving an optimization problem includes (A) causing a cylindrical algebraic decomposition processing unit that carries out a projection processing to carry out the projection processing for a first expression that appears in a quantifier elimination problem equivalent to an optimization problem including a plurality of objective functions and to generate second expressions that are projection factors of the first expression; (B) obtaining data of the generated second expressions from the cylindrical algebraic decomposition processing unit; (C) first calculating a plurality of sets of values of the plurality of objective functions by generating a plurality of value sets of variables in the plurality of objective functions and substituting the generated plurality of value sets of the variables into the plurality of objective functions; (D) extracting points including non-dominated solutions in a space mapped by values of the plurality of objective functions, from a plurality of points corresponding to the plurality of sets of values; (E) second calculating, for each of the second expressions, an evaluation value concerning a distance between a corresponding second expression and each of the extracted points; and (F) identifying a second expression whose evaluation value is minimum.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 12 is a diagram depicting an example of data stored in a Pareto data storage unit;

FIG. 13 is a diagram depicting an example of data stored in an output data storage unit;

FIG. 14 is a diagram depicting an example of data stored in the output data storage unit;

DESCRIPTION OF EMBODIMENTS

Figure 1:
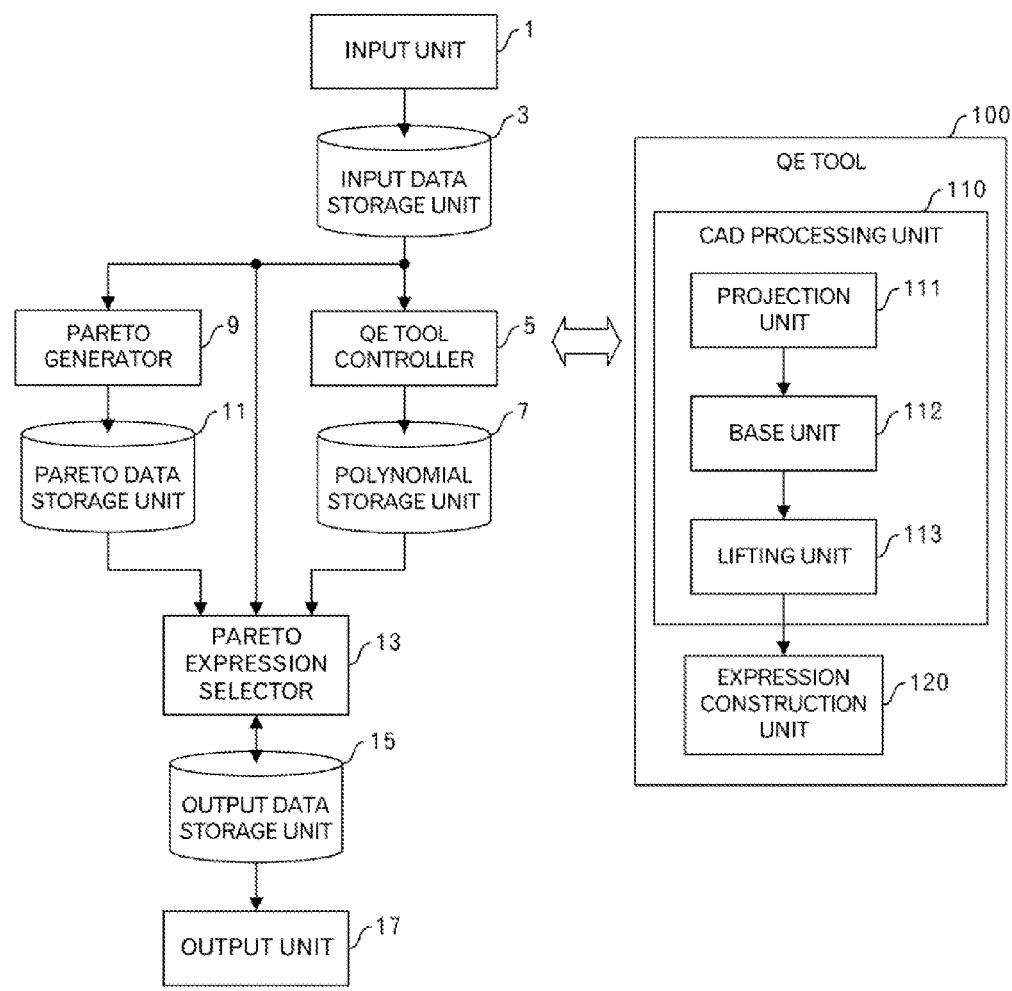
FIG. 1 is a functional block diagram of an optimization processing apparatus.

FIG. 1 illustrates a functional configuration of an optimization processing apparatus relating to this embodiment. The optimization processing apparatus has (A) an input unit 1 to accept data from a user or the like; (B) input data storage unit 3 storing data from the input unit 1; (C) Quantifier Elimination (QE) tool controller 5 to cause a QE tool 100 to carry out a processing by using data stored in the input data storage unit 3 and the like; (D) Pareto generator 9 to carry out a processing by using data stored in the input data storage unit 3 and the like; (E) polynomial storage unit 7 storing processing results of the QE tool controller 5 and the like; (F) Pareto data storage unit 11 storing processing results of the Pareto generator 9 and the like; (G) Pareto expression selector 13 to carry out a processing by using data stored in the input data storage unit 3, polynomial storage unit 7 and Pareto data storage unit 11; (H) output data storage unit 15 storing processing results of the Pareto expression selector 13 and the like; and (I) output unit 17 to output data stored in the output data storage unit 15 to an output device such as a printer or display device.

The QE tool 100 is a module or apparatus for carrying out a QE processing described in the background art, and has a Cylindrical Algebraic Decomposition (CAD) processing unit 110 and expression construction unit 120. The CAD processing unit 110 has a projection unit 111, base unit 112 and lifting unit 113. Incidentally, the QE tool 100 may be included in the optimization processing apparatus, may be other apparatus, or may be included in other apparatus.

Typically, as described in the background art, expressions with quantifiers are inputted into the QE tool 100 to obtain, as an output of the QE tool 100, expressions without the quantifiers, which are equivalent to the expressions with the quantifiers. In other words, the expressions with the quantifiers are processed in the projection unit 111, outputs of the projection unit 111 are processed in the base unit 112, outputs of the base unit 112 are processed in the lifting unit 113, and outputs of the lifting unit 113 are processed in the expression construction unit 120. Accordingly, the expressions without the quantifiers are outputted.

Figures 2, 4:
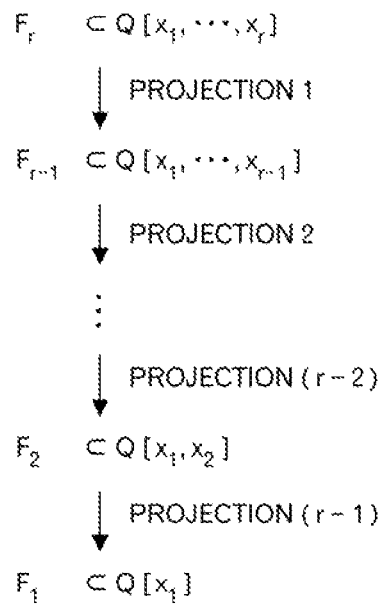
FIG. 2 is a diagram to explain a projection processing.
FIG. 4 is a diagram depicting an example of a multiobjective optimization problem.

In this embodiment, because only the processing results of the projection unit 111 are used, only the processing contents of the projection unit 111 will be explained more or less. As depicted in FIG. 2, when a polynomial set $F_r$ including variables $x_1$ to $x_r$ is given, a first projection processing so as to remove the variable $x_r$ is carried out for the polynomial set $F_r$. Incidentally, Q represents a set of all of the polynomials of real value coefficients, which include variables included in parentheses. When the first projection processing is carried out, the polynomial set $F_{r-1}$ including the variables $x_1$ to $x_{r-1}$ is obtained. Furthermore, a second projection processing is carried out for the polynomial set $F_{r-1}$ so as to remove the variable $x_{r-1}$. Then, a polynomial set $F_{r-2}$ including the variables $x_1$ to $x_{r-2}$ is obtained.

By repeating such a processing, a (r-1)-th projection processing is carried out for the polynomial set $F_2$ so as to remove the variable $x_2$. Then, the polynomial set $F_1$ including only the variable $x_1$ is obtained. The projection unit 111 outputs all of the polynomial sets $F_r$ to $F_1$, when the number of variables becomes "1".

The projection processing to remove the variable $x_r$ from the polynomial set $F_r$ is a processing to generate (A) a coefficient of the variable $x_r$ in each polynomial f included in the polynomial set $F_r$, (B) a discriminant of each polynomial f included in the polynomial set $F_r$ and (C) a resultant of respective polynomial f and g (f is not equal to g) included in the polynomial set $F_r$.

For example, a case where the projection processing is carried out for the polynomial set $F_4$ described below will be considered.

$$F_4 = \{f_1 - 4x_1, f_2 - x_1 + x_1x_2 - 5, x_1 - 5, x_1 - 1, x_1 - 4, x_2 - 2, x_2 - 1\}$$

First, when the first projection processing to remove the variable $x_2$ is carried out for the polynomial set $F_4$, the polynomial set $F_3$ described below is obtained.

$$F_3 = \{x_1 - 4, x_1, 4x_1 + (-f_1^2), x_1, x_1 + (-f_2 - 5), x_1 + (f_2 + 5)\}$$

Furthermore, when the second projection processing to remove the variable $x_1$ is carried out for the polynomial set $F_3$, the polynomial set $F_2$ is obtained as follows:

$$F_2 = \{f_2 + 1, f_2 + 4, f_2 + 5, f_2 + 6, f_2 + 9, 4f_2 + (-f_1^2 + 20), 4f_2 + (f_1^2 + 20)\}$$

Finally, when the third projection processing to remove the variable $f_2$ is carried out for the polynomial set $F_2$, the polynomial set $F_1$ is obtained as follows:

$$F_1 = \{f_1 - 4, f_1 - 2, f_1, f_1 + 2, f_1 + 4, f_1^2 + 4, f_1^2 + 16\}$$

Next, the operation of the optimization processing apparatus depicted in FIG. 1 will be explained by using FIGS. 3 to 15.

Figure 3:
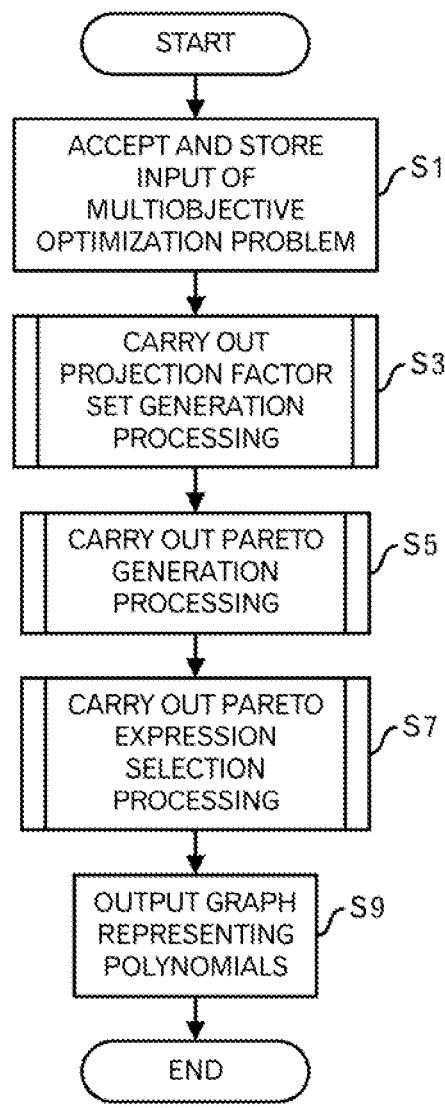
FIG. 3 is a diagram depicting a main processing flow.

First, the user inputs a multiobjective optimization problem to be solved this time to the input unit 1 of the optimization processing apparatus. The input unit 1 accepts the input of the multiobjective optimization problem from the user, and stores input data of the multiobjective optimization problem into the input data storage unit 3 (FIG. 3: step S1). Incidentally, the data to be inputted includes parameters used in the following processing. Specifically, the upper limit value of the number of samplings and distance 6 of a judgment reference are included. According to circumstances, a type of an algorithm to generate variable values may be included.

For example, a multiobjective optimization problem that two objective functions $f_1$ and $f_2$ are simultaneously minimized under the constraint conditions is considered. Specifically, it is assumed that data of the multiobjective optimization problem as depicted in FIG. 4 is inputted. As understood from FIG. 4, the objective function $f_1$ includes the variable $x_1$, and the objective function $f_2$ includes variables $x_1$ and $x_2$. Then, the constraint conditions ($x_1 - 1 \geq 0$, $4 - x_1 \geq 0$, $x_2 - 1 \geq 0$, $2 - x_2 \geq 0$) for the variables $x_1$ and $x_2$ are also defined.

Next, the QE tool controller 5 carries out a projection factor set generation processing by using data stored in the input data storage unit 3 (step S3). This projection factor set generation processing will be explained by using FIGS. 5 and 6.

Figures 5, 6:
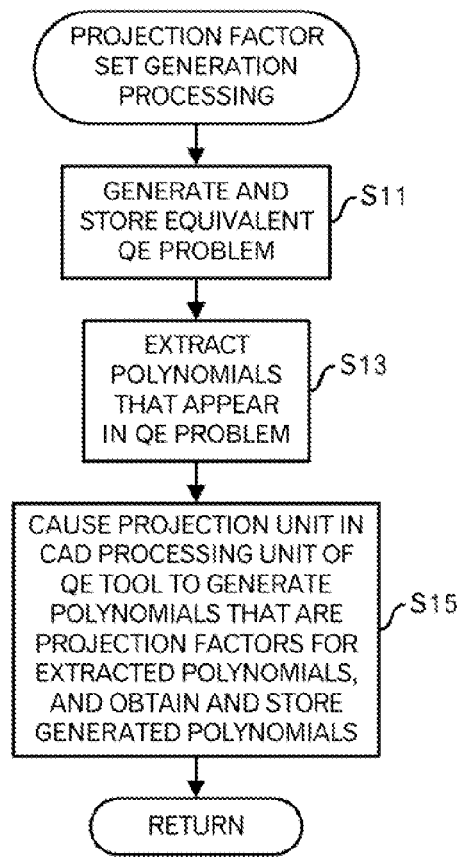
FIG. 5 is a diagram depicting a processing flow of a projection factor set generation processing.
FIG. 6 is a diagram depicting an example of a QE problem.
Figure 7:
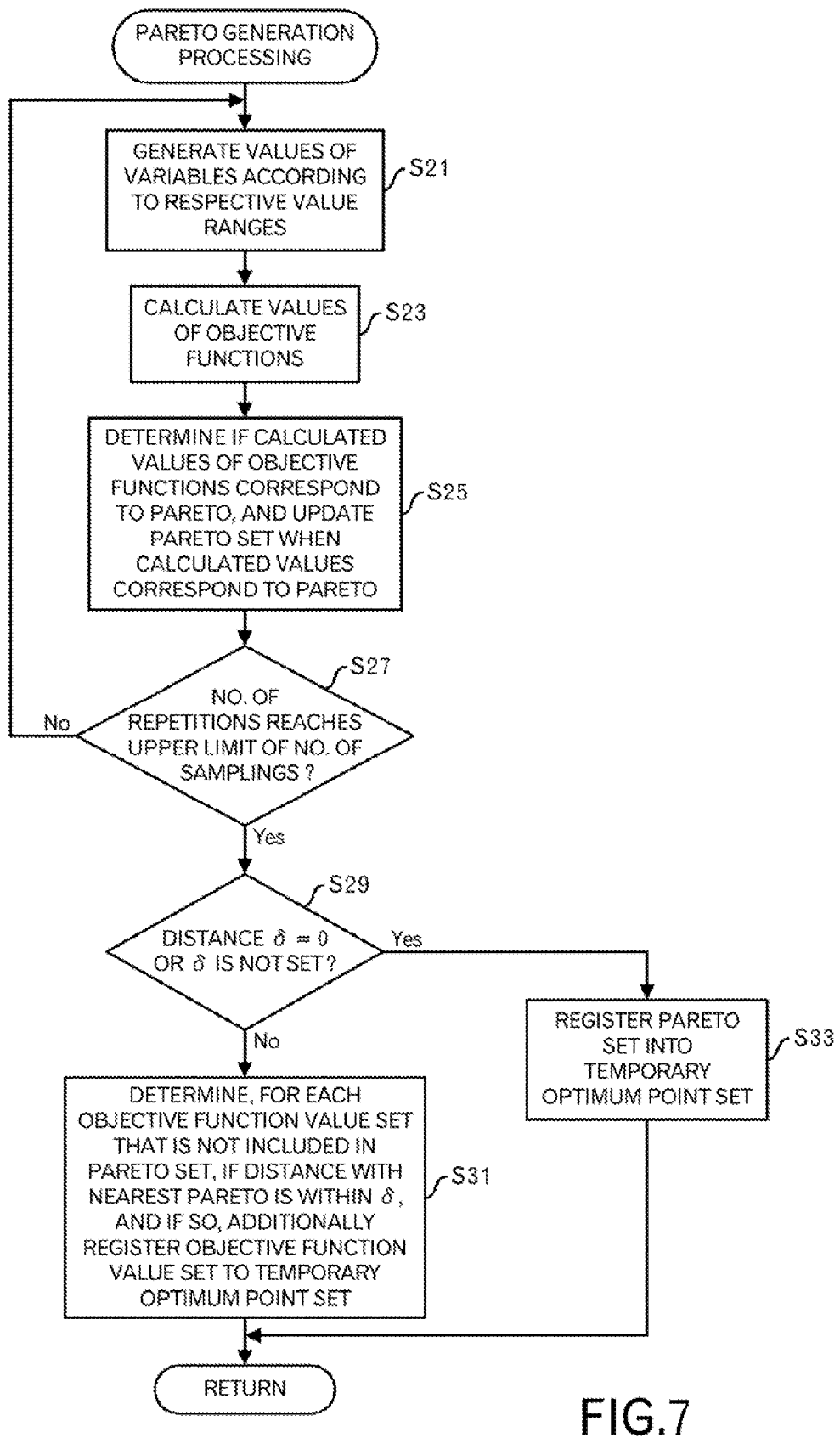
FIG. 7 is a diagram depicting a processing flow of a Pareto generation processing.

The QE tool controller 5 generates an equivalent QE problem from data of the multiobjective optimization problem, which is stored in the input data storage unit 3, and stores the data of the QE problem into a storage device such as a main memory (FIG. 5: step S11). In case of the multiobjective optimization problem depicted in FIG. 4, the equivalent QE problem as depicted in FIG. 6 is generated. As understood from FIG. 6, the expressions of the objective functions and expressions of the constraint conditions are coupled and a quantifier "∃" representing existence is added to the variables $x_1$ and $x_2$ in the objective functions. Instead of the multiobjective optimization problem, the QE problem may be inputted through the input unit 1.

Then, the QE tool controller 5 extracts polynomials (in some cases, including monomial. Hereinafter, the same is applied), and stores the extracted data into the storage device such as the main memory (step S13). After simplifying the polynomials of the QE problem, they are extracted. In case of FIG. 6, the polynomials included in the aforementioned polynomial set $F_4$ is obtained.

Then, the QE tool controller 5 outputs data of the extracted polynomials (actually, polynomial set) to the projection unit 111 in the CAD processing unit 110 of the QE tool 100, causes the projection unit 111 to generate other polynomials (actually, polynomial set) that are projection factors for the extracted polynomials, by causing the projection unit 111 to carry out the projection processing, and obtains data of other polynomials that are projection factors from the QE tool 100, and stores the obtained data into the polynomial storage unit 7 (step S15). In the aforementioned example, the polynomial sets $F_4$ to $F_1$ are obtained as other polynomials that are projection factors are obtained and stored into the polynomial storage unit 7. Then, the processing returns to the calling source processing.

Thus, because the processing of the base unit 112 and lifting unit 113, which are other than the projection unit 111, and the processing of the expression construction unit 120 are omitted, it is possible to obtain the processing result in a short processing time.

Returning to explanation of the processing of FIG. 3, the Pareto generator 9 carries out a Pareto generation processing by using data stored in the input data storage unit 3 (step S5). This Pareto generation processing will be explained by using FIGS. 7 to 9. Incidentally, because the steps S3 and S5 are independent processing, it is possible to exchange the order of the steps, and to execute them in parallel.

First, the Pareto generator 9 generates one set of variable values according to value ranges of the respective variables included in the objective functions included in data of the optimization problem, which is stored in the input data storage unit 3, and stores the generated set of the respective variables into the storage device such as the main memory (step S21). Then, the Pareto generator 9 calculates values of the respective objective functions by substituting the generated values of the variables into the respective objection functions, and stores the calculation result into the storage unit such as the main memory (step S23). As apparent from FIG. 4, because the value ranges of the variables "$x_1-1 \geq 0, 4-x_1 \geq 0, x_2-1 \geq 0, 2-x_2 \geq 0$" are defined in the constraint conditions, appropriate variable values are generated among the value ranges, and are substituted into the objective functions. The generation of the variable values may be carried out randomly, or according to the known algorithm such as Genetic Algorithm, Particle Swarm Optimization (PSO), or Latin Hyper-cubic method (LHC). Such an algorithm may be designated at the step S1 by the designer.

Then, the Pareto generator 9 determines whether or not a set of the calculated objective function values (which correspond to a point in an objective function space) represents a Pareto (i.e. non-dominated solution) in the objective function space, and when the set represents the Pareto, the Pareto generator 9 updates the Pareto set (step S25).

For example, a Pareto list in which points included in the Pareto set are registered is stored in the Pareto data storage unit 11. In addition, a non-Pareto list in which points, which are not included in the Pareto set, are registered, is also stored in the Pareto data storage unit 11. Then, when a new point corresponding to the set of the objective function values, which were calculated this time, is dominated by any one of the points already registered in the Pareto list, the new point is registered into the non-Pareto list. The domination means all of the objective function values are equal or better, namely has equal or lesser values in this example.

On the other hand, when the new point is not dominated by any one of the points already registered in the Pareto list, the new point is registered into the Pareto list. On the other hand, when any point, which has already been registered in the Pareto list, is dominated by the new point, this point is removed from the Pareto list and registered into the non-Pareto list.

Then, the Pareto generator 9 determines whether or not the number of sets of the objective function values generated at the step S23 reaches the upper limit value of the number of samplings (step S27). When the number of sets of the generated objective function values does not reach the upper limit value of the number of samplings, the processing returns to the step S21.

Figure 8:
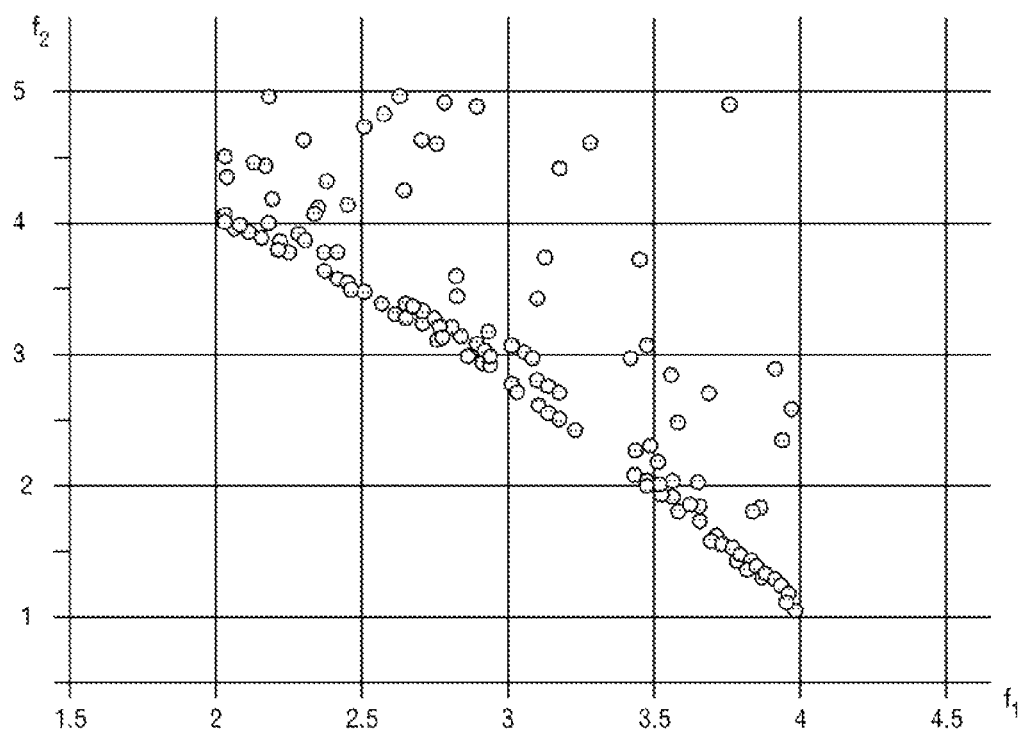
FIG. 8 is a diagram depicting an example of an objective function plane.

In the example of FIG. 4, points as depicted in FIG. 8 are arranged in an objective function space. Namely, in the example of FIG. 8, a horizontal axis represents the objective function $f_1$ and a vertical axis represents the objective function $f_2$. By carrying out the step S23, the respective points as depicted in FIG. 8 are generated. A point that is non-dominated solution in the lower left near the origin among them is included in the Pareto set.

When it is determined at the step S27 that the number of sets of the generated objective function values reaches the upper limit value of the number of samplings, the Pareto generator 9 determines whether or not "0" is set to the distance δ stored in the input data storage unit 3 or the distance δ is not completely defined (step S29). In this embodiment, in order to make preparations for a case where the number of Paretos is lesser or the like, a point whose distance from a point included in the Pareto set is equal to or less than the distance δ is additionally registered into the Pareto set, supplementarily. However, when "0" is set to the distance δ or the distance δ is not completely set, the Pareto generator 9 registers the points in the Pareto set into a temporary optimum point set (step S30). A list of the temporary optimum point set is stored in the Pareto data storage unit 11. Then, the processing returns to the calling source processing.

On the other hand, when any value, which is not "0", is set to the distance δ, the Pareto generator 9 determines, for each of the objective function value sets, which is not included in the Pareto set or is included in the non-Pareto set, whether or not the distance with the nearest Pareto is within the δ, and registers the objective function value set into the temporary optimum point set if the distance with the nearest Pareto is within the δ (step S31). The list of the temporary optimum point set is prepared in the Pareto data storage unit 11, and the points registered in the Pareto list is registered in the list, initially. Then, the point, which is determined at the step S31 to be within the δ, is additionally registered. After that, the processing returns to the calling source processing.

Figure 9:
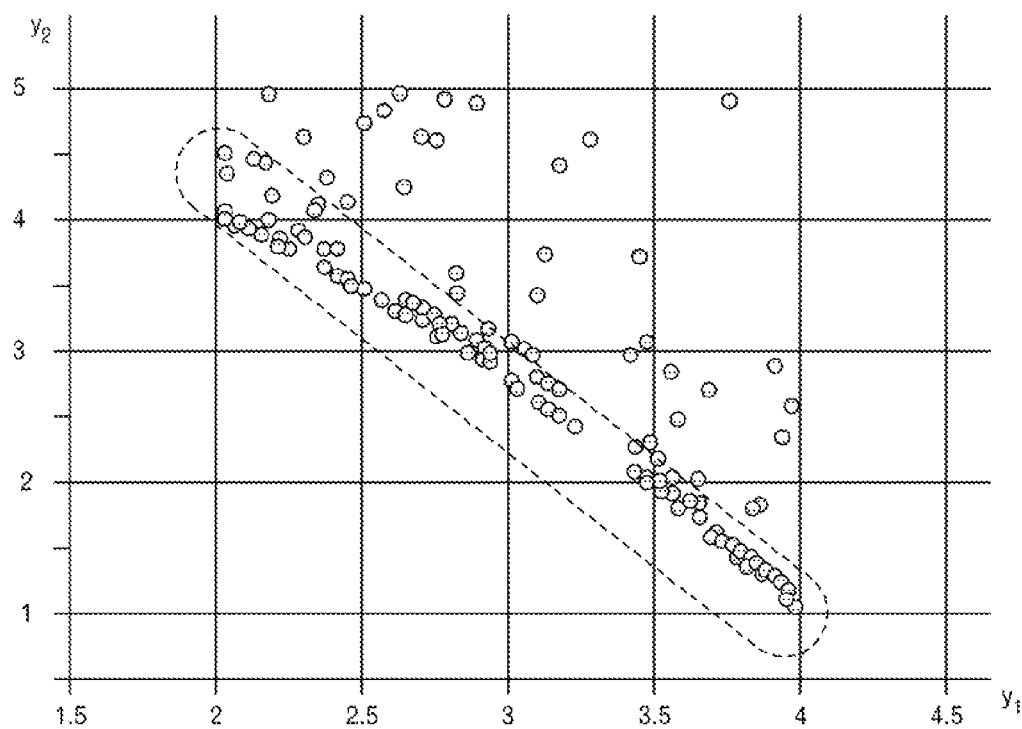
FIG. 9 is a diagram to explain a temporary optimum point set.

When the step S31 is carried out, a portion surrounded by the dotted line becomes included in the temporary optimum point set as depicted in FIG. 9, for example.

Returning to the explanation of the processing of FIG. 3, the Pareto expression selector 13 carries out a Pareto expression selection processing by using data stored in the input data storage unit 3, Pareto data storage unit 11 and polynomial storage unit 7 (step S7). The Pareto expression selection processing will be explained by using FIGS. 10 to 15.

Figure 10:
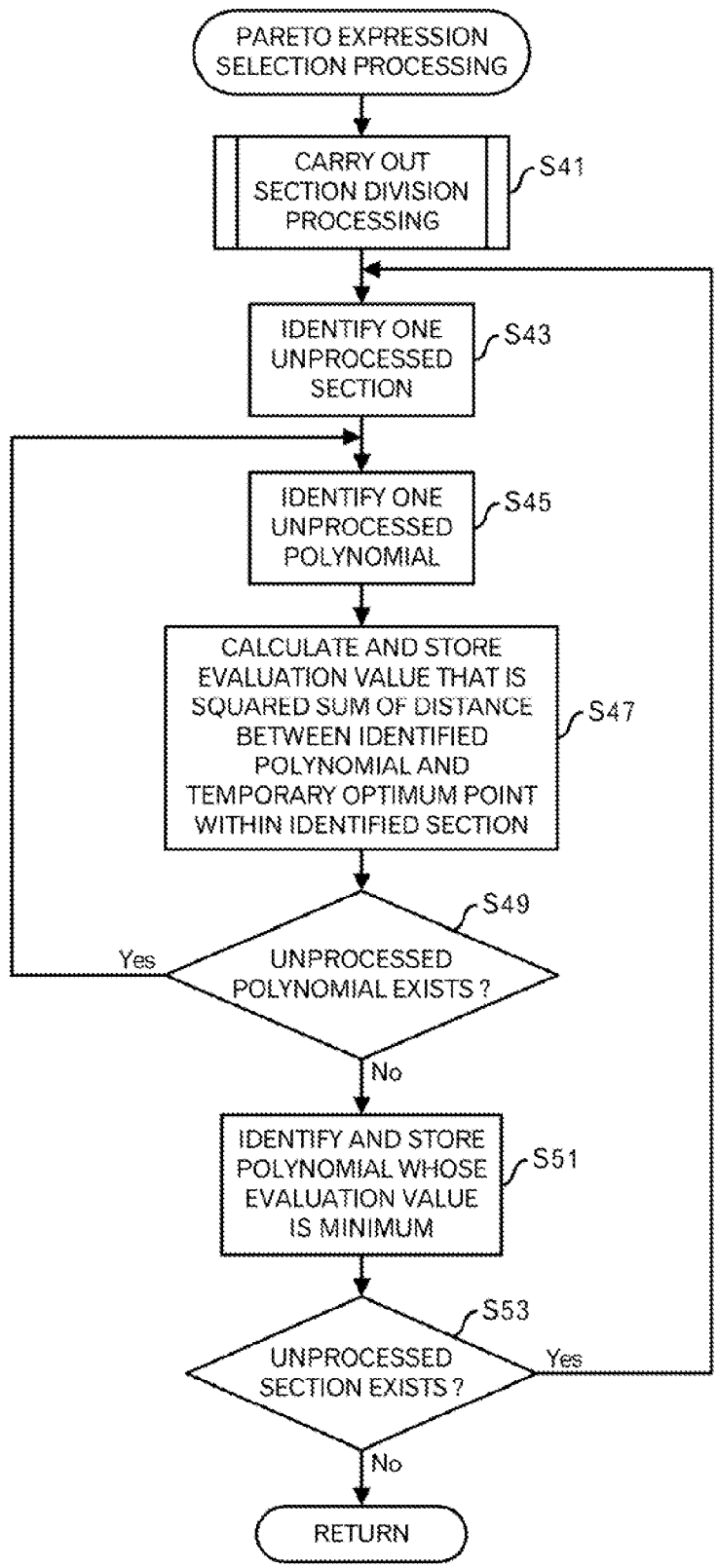
FIG. 10 is a diagram depicting a processing flow of a Pareto expression selection processing.

Firstly, the Pareto expression selector 13 carries out a section division processing (FIG. 10: step S41). The optimum solution on the objective function plane (generally, space) as depicted in FIG. 9 is not always represented by one curve. Because there is a case where a different curve represents the optimum solution for each section, the section division is carried out appropriately to identify, for each section, a curve representing the optimum solution. The section division processing will be explained by using FIGS. 11 and 12.

Figure 11:
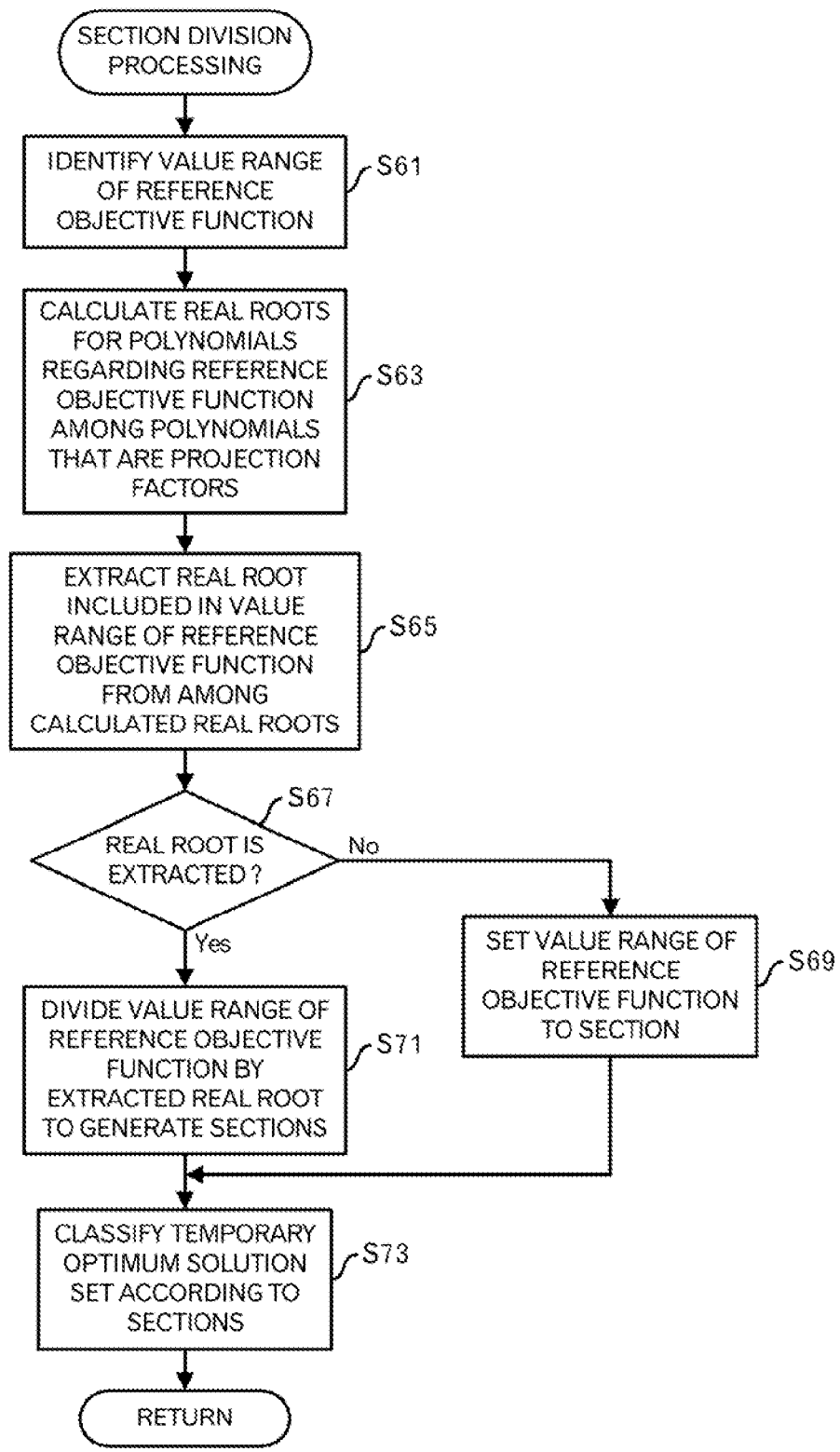
FIG. 11 is a diagram depicting a processing flow of a section division processing.

The Pareto expression selector 13 identifies a value range of a reference objective function from data of the optimization problem, which is stored in the input data storage unit 3 (FIG. 11: step S61). For example, the objective function $f_1$ is the reference objective function. Then, the value range of the objective function $f_1$ can be calculated from the value ranges of the variables $x_1$ and $x_2$, which are included in the constraint conditions. Specifically, in this case, the value range of the objective function $f_1$ is calculated as [2, 4] from the upper limit value and lower limit value of $x_1$.

Next, the Pareto expression selector 13 calculates real roots for the polynomials for the reference objective function among the polynomials of the projection factors, which are stored in the polynomial storage unit 7, and stores the calculated real roots into the storage unit such as the main memory (step S63). As for the objective function $f_1$ in the aforementioned example, the polynomial, for which the real root can be calculated, is included in the polynomial set $F_1$. The real roots for the respective polynomials included in the polynomial set $F_1$ are −4, −2, 0, 2 and 4.

Then, the Pareto expression selector 13 extracts a real root included in the value range of the reference objective function from the real roots calculated at the step S63, and stores the extracted real root into the storage device such as the main memory (step S65). In this example, because the value range is [2, 4], the real roots "2" and "4" are extracted. However, no real root may be extracted.

Therefore, when no real root included in the value range is extracted (step S67: No route), the Pareto expression selector 13 sets the value range itself of the reference objective function as the section, and stores data of the section into the output data storage unit 15 (step S69). Then, the processing shifts to step S73.

On the other hand, when the real root included in the value range is extracted (step S67: Yes route), the Pareto expression selector 13 divides the value range of the reference objective function by using the extracted real root to generate the sections, and stores data of the sections into the output data storage unit 15 (step S71). In this example, the value range is [2, 4], and the extracted real roots are "2" and "4". Therefore, the section becomes [2, 4], as a result. Generally, when the value range is [l, r] and the real roots $q_1, q_2, \ldots q_j$ are extracted at the step S65, the value range is divided into sections [l, $q_1$], [$q_1$, $q_2$], [$q_2$, $q_3$], … [$q_j$, r].

Then, the Pareto expression selector 13 classifies points included in the temporary optimum point set stored in the Pareto data storage unit 11 according to data of the sections, which is stored in the output data storage unit 15, and stores the classification result into the Pareto data storage unit 11 (step S73). For example, data as illustrated in FIG. 12 is stored in the Pareto data storage unit 11. In an example of FIG. 12, a value of the objective function $f_1$, a value of the objective function $f_2$ corresponding to the value of the objective function $f_1$ and a section number are registered. For example, the section number is assigned in ascending order of the value of the section, and the corresponding section number is registered. Then, the processing returns to the calling source processing.

Returning to the explanation of the processing of FIG. 10, the Pareto expression selector 13 identifies one unprocessed section registered in the output data storage unit 15 (step S43). Then, the Pareto expression selector 13 identifies one unprocessed polynomial in the polynomial storage unit 7 (step S45). After that, the Pareto expression selector 13 calculates, as an evaluation value, a squared-sum of the distance between the identified polynomial and the temporary optimum point within the identified section, and stores the calculated evaluation value into the output data storage unit 15 in association with the polynomial (step S47).

For example, when the temporary optimum point belonging to the temporary optimum point set $OP_k$ in the section k is represented as $P_{j,k}$, and the polynomial stored in the polynomial storage unit 7 is represented as $G_i$, the evaluation value $D_{i,k}$ is represented as follows:

$$D_{i,k} = \sum_{P_{j,k} \in OP_k} (\text{distance}(P_{j,k}, G_i)^2) \qquad (1)$$

distance (A, B) represents a distance between the expression B and the point A. The distance between the curve and the point is well-known. Therefore, the detailed explanation is omitted. This expression (1) is a mere example, and the square root of the squared-sum of the distance may be employed, or the average value calculated by dividing the distance by the number of corresponding temporary optimum points may be employed.

Then, the Pareto expression selector 13 determines whether or not any unprocessed polynomial exists in the polynomial storage unit 7 (step S49). When there is at least one unprocessed polynomial, the processing returns to the step S45. By repeating this processing, data as depicted in FIG. 13 is obtained, for example. In an example of FIG. 13, the corresponding evaluation value is stored in association with the polynomial.

On the other hand, when there is no unprocessed polynomial, the Pareto expression selector 13 identifies a polynomial whose evaluation value is minimum, and stores the identified polynomial into the output data storage unit 15 in association with the data of the section identified at the step S43 (step S51). For example, a line whose evaluation value is minimum is identified in the data as depicted in FIG. 13, and the polynomial in the identified line is identified.

Then, the Pareto expression selector 13 determines whether or not any unprocessed section exists among sections stored in the output data storage unit 15 (step S53). When there is at least one unprocessed section, the processing returns to the step S43. On the other hand, when there is no unprocessed section, the processing returns to the calling source processing.

By carrying out such a processing, data as depicted in FIG. 14 is stored in the output data storage unit 15, for example. In an example of FIG. 14, data of the polynomial whose evaluation value is minimum is registered for each section. Incidentally, in the aforementioned example, a polynomial "$4f_2 + f_1^2 - 20$" is identified for the section [2, 4].

Returning to the explanation of the processing in FIG. 3, the output unit 17 outputs a graph representing the polynomials by using data of the section and polynomials, which is stored in the output data storage unit 15, to the output device such as a display device or printer (step S9). For example, in case of the polynomial "$4f_2 + f_1^2 - 20$", "$4f_2 + f_1^2 - 20 = 0$" is displayed on the display device.

Figure 15:
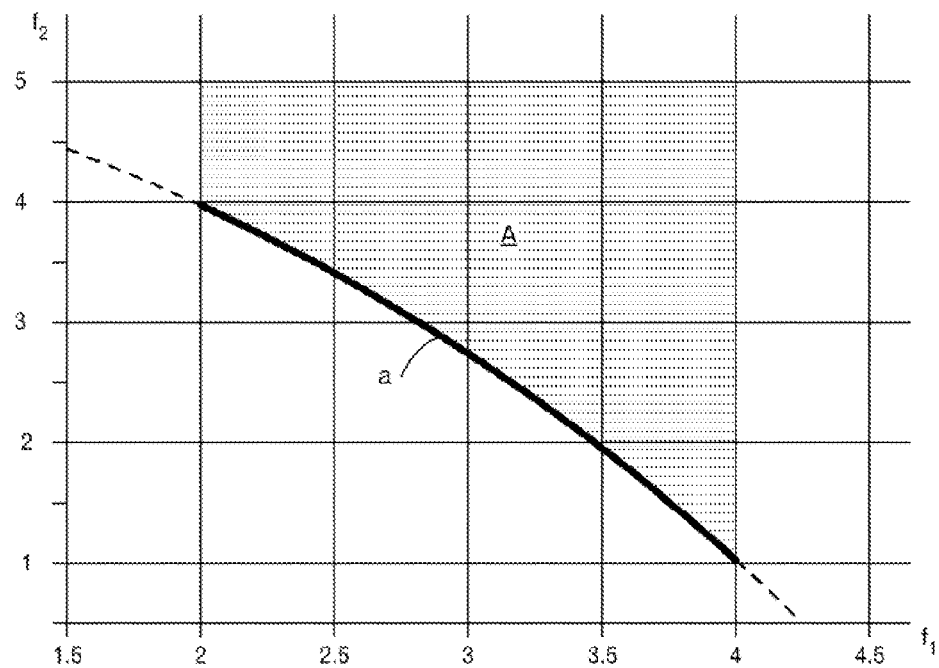
FIG. 15 is a diagram depicting an example of output data.

For example, a graph as depicted in FIG. 15 is displayed. In an example of FIG. 15, the horizontal axis represents the objective function $f_1$, and the vertical axis represents the objective function $f_2$. A curve "a" represents the aforementioned polynomial. Incidentally, a hatched region A is a region identified when the feasible region is entirely solved according to the computer algebra by the QE tool 100. Specifically, a following expression is obtained according to the computer algebra.
$[f_1-2\geq 0 \vee f_1+2\leq 0] \wedge f_1+4\geq 0 \wedge f_1-4\leq 0 \wedge f_2-5\leq 0 \wedge 4f_2+f_1^2-20\geq 0$ When the computer algebra is employed, it takes a long time. However, according to this embodiment, a similar result can be obtained by the simple processing and in short time.

Although the embodiment of this technique was explained, this technique is not limited to the embodiment. For example, the functional block diagram in FIG. 1 is a mere example, and does not always correspond to an actual program module configuration. In addition, as for the processing flow, as long as the processing result does not change, the order of the steps may be exchanged or the plural steps may be executed in parallel.

Furthermore, in the aforementioned example, one computer executes the processing. However, the aforementioned processing may be shared by plural computers.

Moreover, although a processing for two objective functions was explained, three or more objective functions can be processed, similarly.

Figure 16:
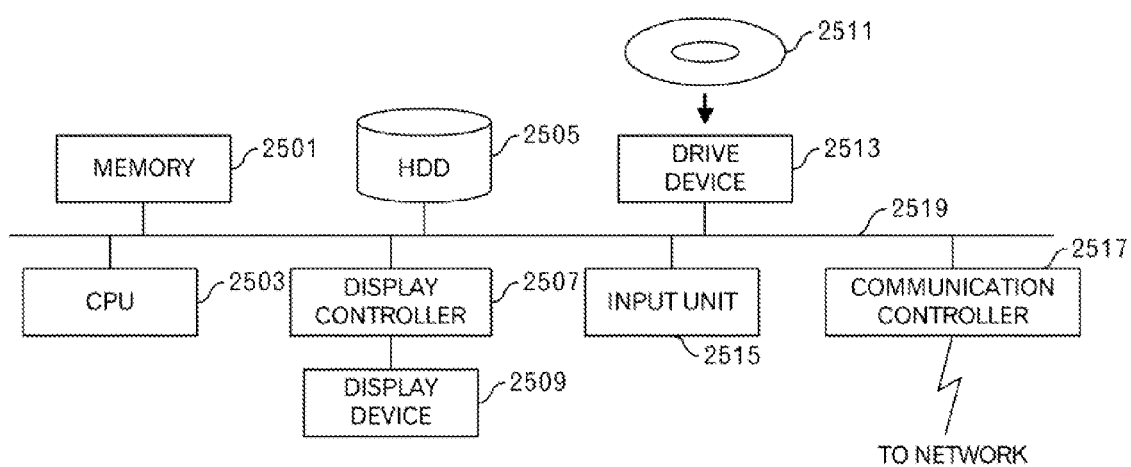
FIG. 16 is a functional block diagram of a computer.

In addition, the optimization processing apparatus is a computer device as shown in FIG. 16. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 16. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An optimization problem solving method relating to the embodiment includes (A) causing a cylindrical algebraic decomposition processing unit that carries out a projection processing to carry out the projection processing for a first expression that appears in a quantifier elimination problem equivalent to an optimization problem including a plurality of objective functions and to generate second expressions that are projection factors of the first expression; (B) obtaining data of the generated second expressions from the cylindrical algebraic decomposition processing unit; (C) first calculating a plurality of sets of values of the plurality of objective functions by generating a plurality of value sets of variables in the plurality of objective functions and substituting the generated plurality of value sets of the variables into the plurality of objective functions; (D) extracting points including non-dominated solutions in a space mapped by values of the plurality of objective functions, from a plurality of points corresponding to the plurality of sets of values; (E) second calculating, for each of the second expressions, an evaluation value concerning a distance between a corresponding second expression and each of the extracted points; and (F) identifying a second expression whose evaluation value is minimum.

The aforementioned processing is more simple and is carried out in shorter time than a processing normally carried out by the CAD processing unit after the projection processing. Therefore, it becomes possible to obtain an expression representing the solution of the optimization problem for two or more objective functions at high speed.

Moreover, the extracting may include extracting points whose distance with the non-dominated solution is equal to or less than a predetermined value from among the plurality of points. For example, it is more effective in case where the number of non-dominated solutions is less.

Furthermore, the second calculating may include: identifying a value range of a specific objective function among the plurality of objective functions from the optimization problem; extracting third expressions concerning the specific objective function from among the second expressions; calculating real roots of the extracted third expressions; extracting a real root within the identified value range of the specific objective function from among the calculated real roots; dividing the value range of the specific objective function by the extracted real root into a plurality of sections; and classifying the extracted points into classes according to the plurality of sections. At that time, the second calculating may be carried out for each of the plurality of sections and for the extracted points that are included in a class corresponding to a section to be processed. Thus, it becomes possible to identify an appropriate expression for each section.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory medium storing a program for causing a computer to execute a process, the process comprising:

causing a cylindrical algebraic decomposition processing unit that carries out a projection processing to carry out the projection processing for a first expression that appears in a quantifier elimination problem equivalent to an optimization problem including a plurality of objective functions and to generate second expressions that are projection factors of the first expression;

obtaining data of the generated second expressions from the cylindrical algebraic decomposition processing unit;

first calculating a plurality of sets of values of the plurality of objective functions by generating a plurality of value sets of variables in the plurality of objective functions and substituting the generated plurality of value sets of the variables into the plurality of objective functions;

extracting points including non-dominated solutions in a space mapped by values of the plurality of objective functions, from a plurality of points corresponding to the plurality of sets of values;

second calculating, for each of the second expressions, an evaluation value concerning a distance between a corresponding second expression and each of the extracted points; and identifying a second expression whose evaluation value is minimum.

2. The computer-readable, non-transitory medium as set forth in claim 1, wherein the extracting comprises extracting points whose distance with the non-dominated solution is equal to or less than a predetermined value from among the plurality of points.

3. The computer-readable, non-transitory medium as set forth in claim 1, wherein the second calculating comprises:

identifying a value range of a specific objective function among the plurality of objective functions from the optimization problem;

extracting third expressions concerning the specific objective function from among the second expressions;

calculating real roots of the extracted third expressions;

extracting a real root within the identified value range of the specific objective function from among the calculated real roots;

dividing the value range of the specific objective function by the extracted real root into a plurality of sections; and classifying the extracted points into classes according to the plurality of sections, and the second calculating is carried out for each of the plurality of sections and for the extracted points that are included in a class corresponding to a section to be processed.

4. A method comprising:

causing, by a computer, a cylindrical algebraic decomposition processing unit that carries out a projection processing to carry out the projection processing for a first expression that appears in a quantifier elimination problem equivalent to an optimization problem including a plurality of objective functions and to generate second expressions that are projection factors of the first expression;

obtaining, by the computer, data of the generated second expressions from the cylindrical algebraic decomposition processing unit;

first calculating, by the computer, a plurality of sets of values of the plurality of objective functions by generating a plurality of value sets of variables in the plurality of objective functions and substituting the generated plurality of value sets of the variables into the plurality of objective functions;

extracting, by the computer, points including non-dominated solutions in a space mapped by values of the plurality of objective functions, from a plurality of points corresponding to the plurality of sets of values;

second calculating, by the computer, for each of the second expressions, an evaluation value concerning a distance between a corresponding second expression and each of the extracted points; and identifying, by the computer, a second expression whose evaluation value is minimum.

5. An apparatus comprising:

a storage device;

a controlling unit that causes a cylindrical algebraic decomposition processing unit that carries out a projection processing to carry out the projection processing for a first expression that appears in a quantifier elimination problem equivalent to an optimization problem including a plurality of objective functions and to generate second expressions that are projection factors of the first expression and obtains data of the generated second expressions from the cylindrical algebraic decomposition processing unit;

a generating unit that calculates a plurality of sets of values of the plurality of objective functions by generating a plurality of value sets of variables in the plurality of objective functions and substituting the generated plurality of value sets of the variables into the plurality of objective functions, and extracts points including non-dominated solutions in a space mapped by values of the plurality of objective functions, from a plurality of points corresponding to the plurality of sets of values; and a selecting unit that calculates, for each of the second expressions, an evaluation value concerning a distance between a corresponding second expression and each of the extracted points, stores the evaluation value into the storage device in association with the second expression, and identifies a second expression whose evaluation value is minimum.

6. An apparatus comprising:

a processor configured to execute a procedure, the procedure comprising:

causing a cylindrical algebraic decomposition processing unit that carries out a projection processing to carry out the projection processing for a first expression that appears in a quantifier elimination problem equivalent to an optimization problem including a plurality of objective functions and to generate second expressions that are projection factors of the first expression;

obtaining data of the generated second expressions from the cylindrical algebraic decomposition processing unit;

first calculating a plurality of sets of values of the plurality of objective functions by generating a plurality of value sets of variables in the plurality of objective functions and substituting the generated plurality of value sets of the variables into the plurality of objective functions;

extracting points including non-dominated solutions in a space mapped by values of the plurality of objective functions, from a plurality of points corresponding to the plurality of sets of values;

second calculating for each of the second expressions, an evaluation value concerning a distance between a corresponding second expression and each of the extracted points; and identifying a second expression whose evaluation value is minimum.

* * * * *